US012716523B2

(12) United States Patent
Serrano, III

(10) Patent No.: US 12,716,523 B2
(45) Date of Patent: Aug. 25, 2026

(54) VALVE TRIMS HAVING CELLULAR ARRAYS

(71) Applicant: Emerson Process Management Regulator Technologies, Inc., McKinney, TX (US)

(72) Inventor: Jesse Serrano, III, Marshalltown, IA (US)

(73) Assignee: Emerson Process Management Regulator Technologies, Inc., McKinney, TX (US)

( * ) Notice: Subject to any disclaimer, the term of this patent is extended or adjusted under 35 U.S.C. 154(b) by 16 days.

(21) Appl. No.: 18/924,737

(22) Filed: Oct. 23, 2024

(65) Prior Publication Data

US 2026/0110371 A1 Apr. 23, 2026

(51) Int. Cl.
*F16K 47/04* (2006.01)
*F16K 5/06* (2006.01)
*F16K 5/12* (2006.01)

(52) U.S. Cl.
CPC .......... *F16K 47/045* (2013.01); *F16K 5/0605* (2013.01); *F16K 5/12* (2013.01)

(58) Field of Classification Search
CPC .......... F16K 47/045; F16K 47/04; F16K 5/12; F16K 5/0605
See application file for complete search history.

(56) References Cited

U.S. PATENT DOCUMENTS 4,364,415 A * 12/1982 Polon .................... F16K 47/045 251/127
4,479,510 A * 10/1984 Bey ......................... F16K 47/02 251/127
4,530,375 A * 7/1985 Bey ....................... F16K 47/045 251/127
4,540,025 A * 9/1985 Ledeen ................. F16K 47/045 251/127
4,889,163 A * 12/1989 Engelbertsson ...... F16K 5/0605 251/127
5,070,909 A * 12/1991 Davenport ............ F16K 5/0605 251/315.08

(Continued)

FOREIGN PATENT DOCUMENTS

CN 105240564 A * 1/2016 ........... F16K 47/045
CN 106895173 A * 6/2017 ........... F16K 5/0605

(Continued)

OTHER PUBLICATIONS

Tan et al., "AM Retrofit Solution Resolves Valve Cavitation Issues in South Korea," Industrial Automation Asia, May/Jun./Jul. 2023 Issue, Jun. 2023, 2 pages.

(Continued)

*Primary Examiner* — David Colon-Morales
(74) *Attorney, Agent, or Firm* — Hanley, Flight & Zimmerman, LLC

(57) ABSTRACT

An example trim installable in a fluid control valve includes a honeycomb array. The honeycomb array includes mesh walls surrounding elongated paths between opposing ends of the honeycomb array. The trim also includes a nonpermeable structure surrounding longitudinal sides of the honeycomb array, the nonpermeable structure having openings at the opposing ends of the honeycomb array.

20 Claims, 13 Drawing Sheets

(56) References Cited

U.S. PATENT DOCUMENTS

| | | | | |
|---|---|---|---|---|
| 5,180,139 | A * | 1/1993 | Gethmann | F16K 5/0605 251/207 |
| 5,193,583 | A * | 3/1993 | Gethmann | F16K 5/0605 251/127 |
| 5,332,004 | A * | 7/1994 | Gethmann | F16K 47/045 251/127 |
| 5,680,889 | A * | 10/1997 | Boger | F16K 5/12 251/121 |
| 5,771,929 | A * | 6/1998 | Boger | F16K 47/045 251/127 |
| 6,029,702 | A | 2/2000 | Leinen et al. | |
| 6,520,209 | B1 * | 2/2003 | Lundqvist | F16K 47/045 251/127 |
| 6,868,865 | B2 * | 3/2005 | Tran | F16K 5/0605 137/625.32 |
| 6,886,596 | B2 * | 5/2005 | Tran | F16K 5/0605 137/625.33 |
| 6,923,210 | B2 * | 8/2005 | Tran | F16K 5/0605 137/625.3 |
| 6,974,116 | B1 * | 12/2005 | Christenson | F16K 5/0605 138/43 |
| 7,011,109 | B2 * | 3/2006 | Tran | F16K 5/0605 251/118 |
| 7,044,436 | B2 * | 5/2006 | Corbetta | F16K 47/045 251/315.01 |
| 7,117,894 | B2 * | 10/2006 | Zuccarelli | F16K 47/045 138/42 |
| 7,156,122 | B2 * | 1/2007 | Christenson | F16K 5/0605 251/127 |
| 7,234,488 | B2 * | 6/2007 | Partridge | F16K 5/12 251/127 |
| 8,141,843 | B2 * | 3/2012 | Rimboym | F16K 5/0605 251/315.01 |
| 8,366,070 | B2 | 2/2013 | Rimboym et al. | |
| 9,377,127 | B2 * | 6/2016 | Chen | F16K 47/045 |
| 9,404,591 | B2 * | 8/2016 | Yli-Koski | F16K 1/224 |
| 9,677,687 | B2 * | 6/2017 | Yli-Koski | F16L 55/04 |
| 9,933,089 | B2 * | 4/2018 | Bey | F16K 5/20 |
| 10,100,947 | B2 * | 10/2018 | Gattavari | F16K 47/045 |
| 10,724,643 | B2 * | 7/2020 | Kuhlman | F16K 5/0605 |
| 10,837,562 | B2 * | 11/2020 | Gottlieb | F16K 5/0657 |
| 11,162,613 | B2 * | 11/2021 | Jablonski | F16K 5/0605 |
| 11,209,100 | B2 * | 12/2021 | Bell | F16K 11/056 |
| 11,209,842 | B1 * | 12/2021 | Soliman | F17D 1/20 |
| 11,448,323 | B2 * | 9/2022 | McMahon | B22F 3/1115 |
| 11,624,455 | B2 * | 4/2023 | Jablonski | F16K 27/0218 251/120 |
| 11,686,404 | B2 * | 6/2023 | Bryan | F16K 27/067 251/315.1 |
| 11,698,148 | B1 * | 7/2023 | Eilers | F16K 5/0605 251/127 |
| 11,739,850 | B2 * | 8/2023 | Genta | F16K 47/045 251/118 |
| 11,933,426 | B1 * | 3/2024 | Helfer | F16K 5/12 |
| 12,203,567 | B2 * | 1/2025 | Bonsi | F16K 5/0626 |
| 12,385,577 | B2 * | 8/2025 | Varghese | F16K 47/045 |
| 2015/0233493 | A1 * | 8/2015 | Irgens-Hagevik | F16L 55/02763 251/120 |
| 2025/0237324 | A1 * | 7/2025 | KS | F16K 47/045 |

FOREIGN PATENT DOCUMENTS

| | | | | |
|---|---|---|---|---|
| CN | 107420634 A | * | 12/2017 | F16K 47/045 |
| CN | 206802365 U | * | 12/2017 | F16K 47/045 |
| CN | 111102373 A | * | 5/2020 | F16K 47/04 |
| WO | WO-2015118420 A1 | * | 8/2015 | F16K 47/045 |

OTHER PUBLICATIONS

Emswiler et al., "How Additive Manufacturing Leads to Quieter Control Valves," Smart Manufacturing (Industry 4.0), Apr. 29, 2023, 3 pages.

Becker, "Becker T-Ball Control Valve for Natural Gas Applications, " Baker Hughes, Feb. 2021, 16 pages.

Emerson, "Fisher Vee-Ball Rotary Control Valves," Fisher Controls Catalog, Apr. 2020, 12 pages.

Emerson, "Fisher Vee-Ball with Whisper NXV Trim," Product Bulletin, Apr. 2024, 4 pages.

Emerson, "Fisher Vee-Ball V150, V200, and V300 Rotary Control Valves NPL 1 through 12," Vee-Ball Valves Instruction Manual, Apr. 2024, 56 pages.

Metso, "Neles Q-Ball Quiet Metal Seated Control Ball Valve," Oct. 2012, 2 pages.

* cited by examiner

TOP VIEW

FRONT VIEW

SIDE VIEW

SECTION A-A

SECTION A-A

VALVE TRIMS HAVING CELLULAR ARRAYS

FIELD OF THE DISCLOSURE

This disclosure relates generally to valves and, more particularly, to valve trims having cellular arrays.

BACKGROUND

Valves are used in process control systems to control the flow of process fluids (e.g., water, gas, etc.). A fluid control valve typically has a closure member (e.g., a trim) disposed in a fluid passageway of the valve. A valve stem controls the positioning of the closure member to move the closure member between an open position and a closed position. This allows or restricts fluid flow between an inlet and an outlet of the valve.

Figure 1:
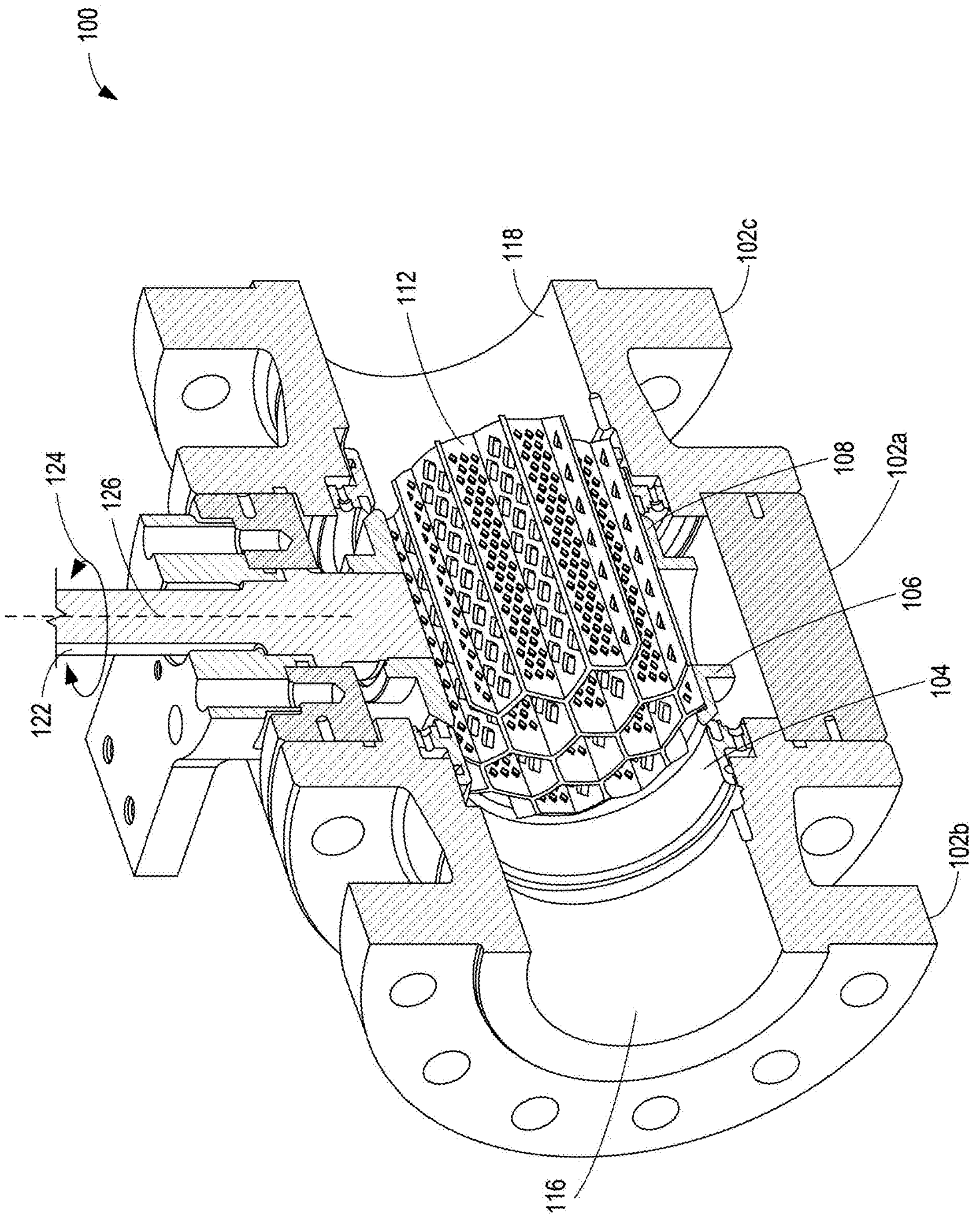
FIG. 1 is a cutaway perspective view of an example ball valve assembly implemented in accordance with teachings of this disclosure.

In general, the same reference numbers will be used throughout the drawings and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Examples disclosed herein may be used to implement ball valve trim devices (e.g., flow control members, flow control elements, flow control structures, etc.) to reduce cavitation and subsequent valve damage in a fluid process system by absorbing fluid energy. Example ball valve trim devices disclosed herein are structured so that their resistance changes based on trim position which can be varied to: (i) block all flow when the trim is fully closed, (ii) gradually decrease flow resistance as the trim gradually opens, and/or (iii) allow the least flow resistance when the trim is fully opened.

Example trim structures disclosed herein create a staged drop in a ball valve assembly that substantially reduces or eliminates cavitation as fluid flows through the ball valve assembly. As used herein, cavitation is the formation and collapse of vapor bubbles (cavities) in liquid flowstreams caused by changes in pressure and velocity. Example negative side effects of uncontrolled cavitation in control valves include high noise, excessive vibration, and/or material damage. Trims implemented in accordance with examples disclosed herein provide improved cavitation at lower travels of a trim (e.g., smaller open positions of the trim in a valve assembly) over prior techniques and improved flow capacity at higher travels (e.g., larger open positions of the trim in the valve assembly) over the prior techniques.

Examples disclosed herein substantially reduce or eliminate cavitation while maintaining a specified valve flow coefficient (Cv) (e.g., a maximum Cv) of a valve. For example, a fluid flow characteristic of a valve can be represented by a flow rate (Q) which corresponds to an amount of fluid that can flow through the valve. The specified valve flow coefficient (Cv) of a valve is based on the flow rate (Q) and fluid characteristics of a fluid that is to flow through the valve. Accordingly, a valve flow coefficient (Cv) can be used to determine an appropriate valve sizing for a specific application. For purposes of handling and installing a valve in an industrial system, it is sometimes desirable to have a valve with a high valve flow coefficient (Cv) and a smaller or lighter valve body. Examples disclosed herein may be used to achieve such characteristics of a valve.

As used herein, a trim is a structure of a valve assembly that impedes or allows fluid flow through the valve assembly based on the position of the trim relative to inlet and outlet ports of the valve assembly. In a ball valve assembly, a trim is implemented as a ball having a bore therethrough that allows fluid flow through the ball valve assembly when the ball is positioned to align its bore with the inlet and outlet ports of the ball valve assembly. As used herein, a fluid is defined to be any liquid fluid (e.g., incompressible) or gaseous fluid (e.g., compressible) of any density, viscosity, etc.

Examples disclosed herein may be used to implement a trim that includes a ball having a bore and a cellular array structure that is fixedly mounted in the bore. The cellular array structure includes multiple elongated passageways extending the length of the array and running substantially parallel to the ball bore such that the elongated passageways extend between an inlet and an outlet of the ball bore. The elongated passageways are adjacent one another forming a cellular array that operates as a bundle of pathways through which fluid can flow. In some examples, elongated passageways in the cellular array have hexagonal profiles that create a honeycomb array.

In examples disclosed herein, the array includes mesh walls that form the elongated passageways (e.g., elongated fluid flow paths). Accordingly, fluid can flow through the array in directions that range from substantially parallel to the elongated passageways to substantially perpendicular to the elongated passageways. For example, as fluid flows through the elongated passageways, the fluid can also flow transversely through mesh walls between neighboring elongated passageways to flow from one elongated passageway to another as the fluid flows from an inlet of a ball bore towards an outlet of the ball bore.

Although examples disclosed herein are described in connection with ball valve assemblies, such disclosed examples may additionally or alternatively be implemented with rotary valves, butterfly valves, segmented ball valves, plug valves, etc. In some examples, examples disclosed herein may be paired with a ported ball or similar design.

FIG. 1 is a cutaway perspective view of an example ball valve assembly 100. The ball valve assembly 100 includes an example valve body 102*a* connected to example tailpieces 102*b, c*. The ball valve assembly 100 also includes an example valve seat 104 and an example flow control trim 106 rotatably coupled to the valve body 102*a*. The flow control trim 106 (e.g., the trim) is a flow control structure that is trunnion-mounted in the valve body 102*a* to be rotated between opened and closed positions. For example, the trim 106 can be trunnion-mounted using trunnion plates to handle high pressure forces in the valve assembly 100. The trim 106 includes an example ball 108 and an example cellular flow path array structure 112 (e.g., an array). In the example of FIG. 1, the array 112 is fixedly secured (e.g., welded) in a bore that runs through the ball 108 along a central axis of the ball 108. Accordingly, the array 112 is arranged in the ball 108 between a fluid inlet (e.g., the fluid inlet 508*a* of FIG. 5D) and a fluid outlet (e.g., the fluid outlet 508*b* of FIG. 5D) of the ball 108. The fixed configuration of the array 112 to the ball 108 creates a ball dynamic trim because the array 112 and the ball 108 move in unison relative to the valve body 102*a* so that the array 112 and the ball 108 can be repositioned in the valve body 102*a* to cooperatively change fluid flow characteristics through the ball valve assembly 100. A surface of the ball 108 sealingly engages the valve seat 104 to open and close a fluid flow path through the valve body 102*a*. However, the array 112 is recessed in the ball 108 to create a clearance between ends of the array 112 and the valve seat 104. Due to this clearance, the array 112 does not engage the valve seat 104 as the trim 106 is repositioned in the valve body 102*a*. This prevents the ends of the array 112 from damaging or reshaping the valve seat 104.

In the example of FIG. 1, the array 112 is a permeable structure that includes mesh walls defining elongated passageways along a length of the array 112. Also in the example of FIG. 1, the ball 108 is a nonpermeable structure implemented as a spherically-contoured housing. The permeable characteristic of the array 112 allows fluid to flow through the array 112 and the nonpermeable characteristic of the ball 108 prevents fluid from flowing through the surface of the ball 108. The trim 106 is coupled to an example stem 122. The stem 122 can be rotated in rotational directions generally indicated by arrow 124 about an axis of rotation 126 of the stem 122 to change the position of the trim 106 within the ball valve assembly 100. By operating the stem 122, the positional changes of the trim 106 can be selected to increase or decrease fluid flow through the ball valve assembly 100.

The ball valve assembly 100 includes an inlet port 116 and an outlet port 118. In the example of FIG. 1, the trim 106 is positioned in a fully open position in which permeable inlet and outlet ends of the array 112 are fully accessible by fluid at the inlet port 116 and the outlet port 118 of the ball valve assembly 100. This fully open position of the trim 106 creates the least flow resistance allowing a maximum fluid flow rate through the ball valve assembly 100. To decrease the fluid flow rate through the ball valve assembly 100, the stem 122 can be rotated to adjust the position of the trim 106 gradually towards a fully closed position. As the stem 122 is rotated, the nonpermeable surface (e.g., a nonpermeable structure) of the ball 108 incrementally blocks or covers a flow path between the inlet port 116 and the outlet port 118 of the ball valve assembly 100. This gradual repositioning of the trim 106 increases flow resistance through the ball valve assembly 100 by decreasing the areas of the array 112 accessible by fluid at the inlet port 116 and the outlet port 118 of the ball valve assembly 100. In some examples, the area of the array 112 accessible by fluid is referred to as the axial projected area. Different example positions of the trim 106 are described below in connection with FIGS. 10A, 10B, 11A, 11B, 12A, and 12B.

Figure 2:
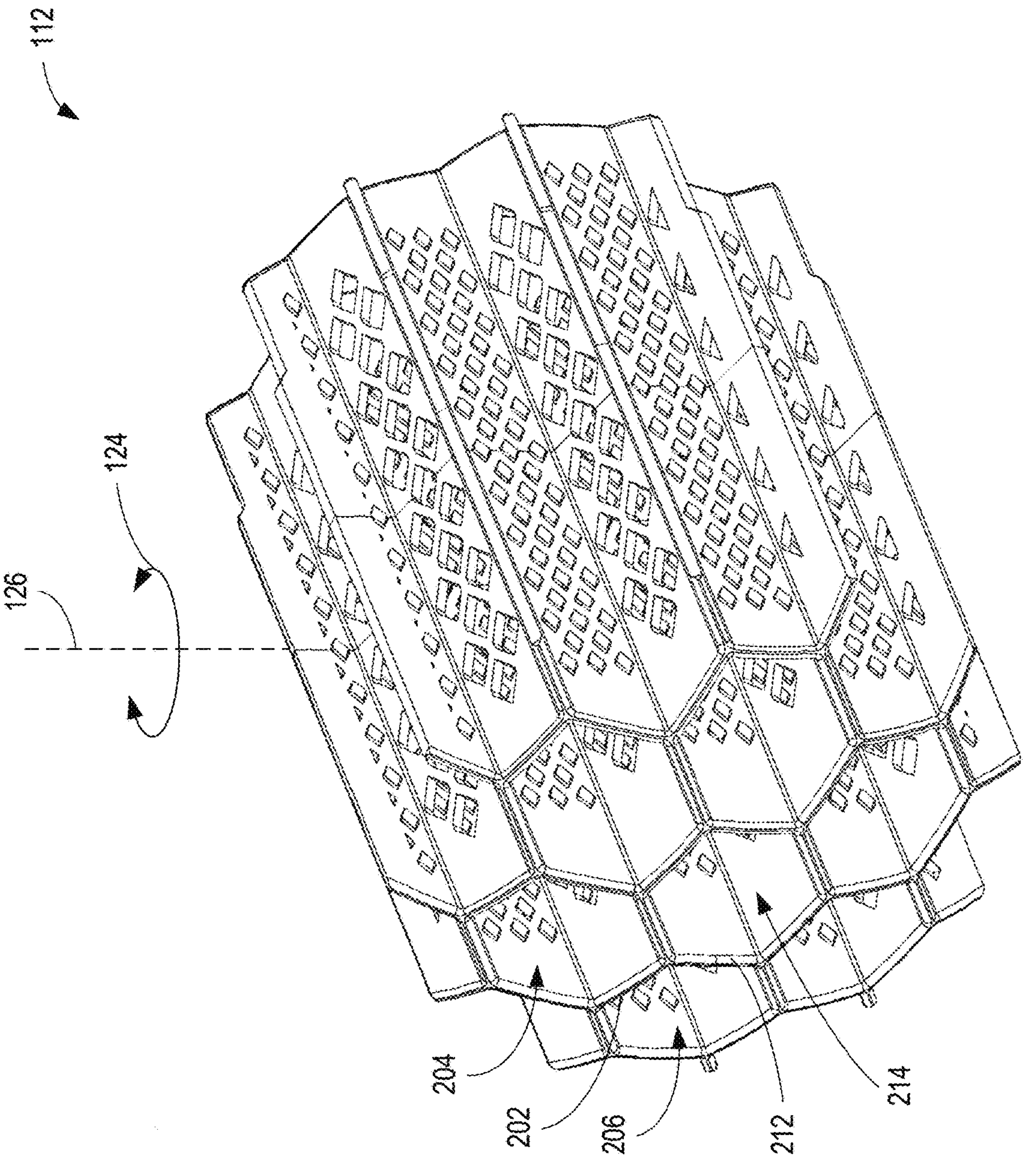
FIG. 2 is a perspective view of the cellular array of FIG. 1.

FIG. 2 is a perspective view of the array 112 of FIG. 1. The array 112 includes mesh walls that are arranged to form a bundle of multiple elongated passageways (e.g., elongated fluid flow paths) extending along a length of the array 112 between opposing ends of the array 112. In the example of FIG. 2, the array 112 includes an example first mesh wall structure 202 (e.g., a mesh wall) that extends along the length of the array 112. The first mesh wall 202 is between an example first elongated passageway 204 and an example second elongated passageway 206 of the elongated passageways. In addition, the array 112 includes an example second mesh wall structure 212 (e.g., a mesh wall) that extends along the length of the array 112. The second mesh wall 212 is between the second elongated passageway 206 and an example third elongated passageway 214 of the elongated passageways. The array 112 is installed in the ball 108 (FIG. 1) so that the elongated passageways 204, 206 run substantially parallel to a ball bore of the ball 108 extending between an inlet (e.g., the fluid inlet 508*a* of FIG. 5D) and an outlet (e.g., the fluid outlet 508*b* of the FIG. 5D) of the ball 108. Accordingly, the elongated passageways of the array 112 operate as a bundle of pathways through which fluid can flow through the ball 108. In the illustrated example of FIG. 2, the elongated passageways in the array 112 have hexagonal profiles that structure the array 112 as a honeycomb array. As such, in examples disclosed herein, a honeycomb array is a structure having a plurality of elongated passageways that are adjacent one another to form a bundle of passageways (e.g., a passageway bundle). Fluid flows through the bundle of passageways as the fluid traverses the honeycomb array when, for example, the trim 106 of FIG. 1 is installed in a fluid control valve such as the ball valve assembly 100 of FIG. 1. Although the profiles of the elongated passageways are shown as hexagonal in the example of FIG. 2, in other examples, the profiles may alternatively be implemented using any other suitable shape and/or a combination of differently shaped profiles.

Figure 3:
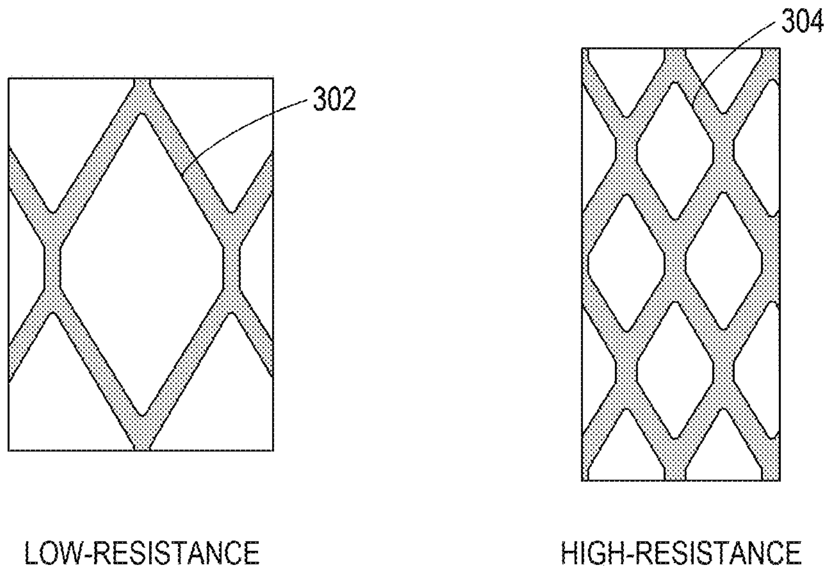
FIG. 3 illustrates magnified views of example low-resistance and high-resistance apertures of mesh walls of the cellular array of FIG. 2.
Figure 5A:
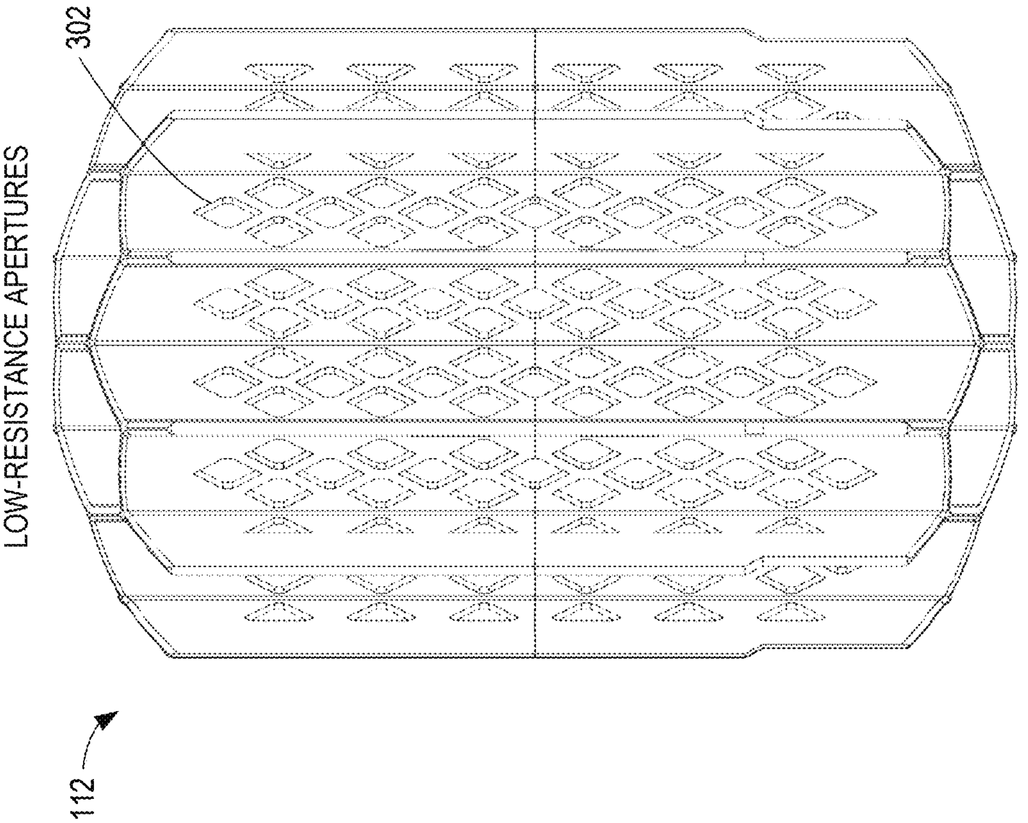
FIG. 5A is a two-dimensional (2D) top view of the cellular array of FIGS. 1 and 2.

The first mesh wall 202 includes example low-resistance apertures 302 (shown in FIG. 3) and the second mesh wall 212 includes example high-resistance apertures 304 (shown in FIG. 3). In the illustrated example, the low-resistance apertures 302 are larger in cross-sectional area than the high-resistance apertures 304 (e.g., the high-resistance apertures 304 are smaller in cross-sectional area than the low-resistance apertures 302). Referring briefly to the 2D top view of the array 112 in FIG. 5A and the 2D side view of the array 112 in 5C, the high-resistance apertures 304 create a denser aperture pattern (e.g., in the second mesh wall 212 of FIG. 2), as shown in FIG. 5C, relative to a density of the low-resistance apertures 302 (e.g., in the first mesh wall 202 of FIG. 2), as shown in FIG. 5A. The apertures 302, 304 may be manufactured to be any suitable shape in the mesh walls 202, 212. For example, the apertures 302, 304 may be any polygonal shape (e.g., diamond-shaped, hexagon-shaped, rhomboid-shaped, octagon-shaped, etc.) or any non-polygonal shape.

Figure 4:
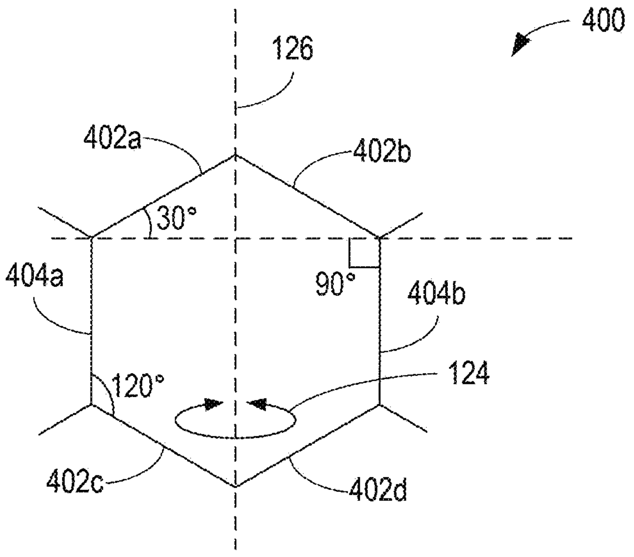
FIG. 4 is a front view of an example elongated passageway of the cellular array of FIGS. 1 and 2.

FIG. 4 shows a regular hexagonal profile of an example elongated passageway 400. The elongated passageway 400 may implement the elongated passageways of the array 112, such as the elongated passageways 204, 206 of FIG. 2. For the regular hexagonal profile of the elongated passageway 400, each of the six interior angles is 120 degrees between mesh walls. The profile of the elongated passageway 400 is defined by example low-resistance mesh walls 402*a-d* (e.g., the first mesh wall 202 of FIG. 2) and example high-resistance mesh walls 404*a, b* (e.g., the second mesh wall 212 of FIG. 2). The mesh walls 402*a-d*, 404*a, b* are used to manage flow resistance through mesh walls that are perpendicular to fluid flow and through mesh walls that are substantially more parallel to fluid flow.

In the illustrated example, the low-resistance mesh walls 402*a-d* are at approximately 30-degree angles relative to a plane perpendicular to the axis of rotation 126 of the stem 122. In other examples, the low-resistance mesh walls 402*a-d* may be manufactured at less than 30-degree angles relative to a plane perpendicular to the axis of rotation 126 of the stem 122. In yet other examples, the low-resistance mesh walls 402*a-d* may be manufactured to be in a range of greater than 30-degree angles and less than 90-degree angles relative to a plane perpendicular to the axis of rotation 126 of the stem 122. Also in the illustrated example, the high-resistance mesh walls 404*a, b* are at approximately 90-degree angles (e.g., substantially perpendicular) to a plane perpendicular to the axis of rotation 126 of the stem 122.

The array 112 is fixed in the ball 108 so that the high-resistance mesh walls 404*a, b* of the array 112 (e.g., the second mesh wall 212 having the high-resistance apertures 304) are substantially parallel to a plane perpendicular to the axis of rotation 126 of the stem 122 (FIG. 1) and, thus, substantially perpendicular to a plane that is perpendicular to the axis of rotation 126 of the stem 122. The low-resistance mesh walls 402*a-d* of the array 112 (e.g., the first mesh wall 202 having the low-resistance apertures 302) are at less than a 90-degree angle relative to a plane that is perpendicular to the axis of rotation 126 of the stem 122.

As the stem 122 rotates along the rotational direction 124 about the axis of rotation 126, the stem 122 repositions the trim 106 between fully opened and fully closed positions. During such repositioning, the high-resistance mesh walls 404*a, b* having the high-resistance apertures 304 (e.g., the second mesh wall 212) transition between being substantially perpendicular to a fluid flow direction (e.g., when the trim 106 is in the fully closed position) to being substantially parallel to fluid flow (e.g., when the trim 106 is in the fully open position). However, the low-resistance mesh walls 402*a-d* having the low-resistance apertures 302 (e.g., the first mesh wall 202) remain substantially less perpendicular (e.g., more parallel than perpendicular) to the flow of fluid regardless of how the stem 122 positions the array 112.

Figure 5B:
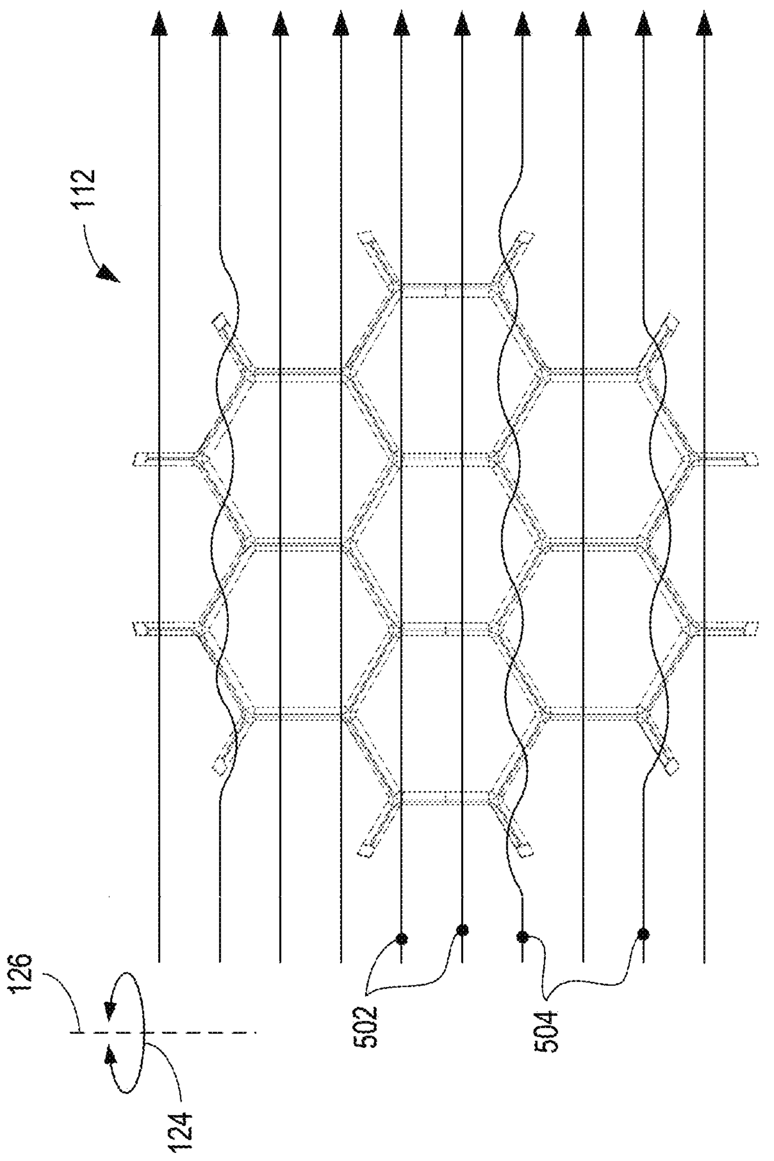
FIG. 5B is a 2D front view of the cellular array of FIGS. 1, 2, and 5A.
Figure 5C:
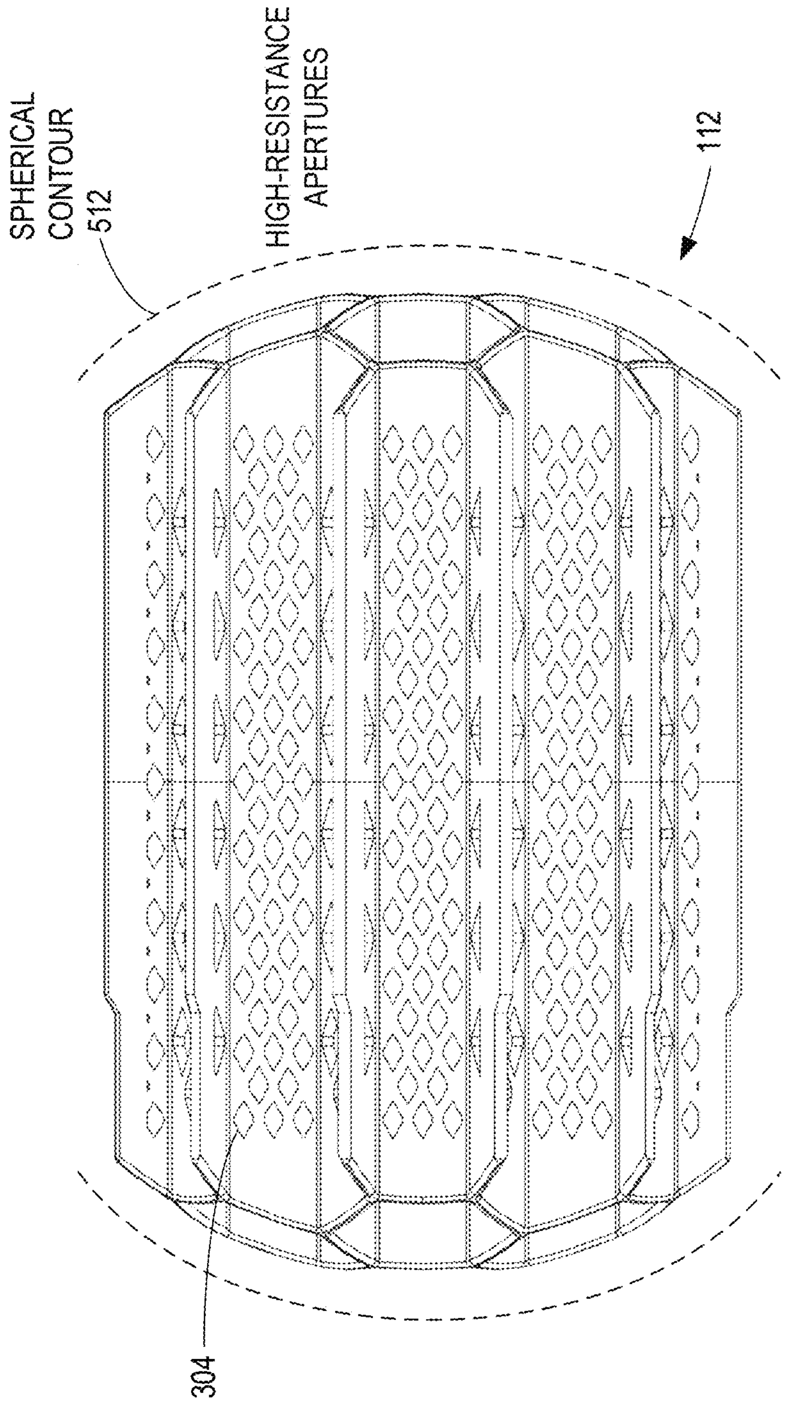
FIG. 5C is a 2D side view of the cellular array of FIGS. 1, 2, 5A, and 5B.

Referring briefly to FIG. 5B, an example front view of the array 112 shows example high-resistance mesh wall flow paths 502 and example low-resistance mesh wall flow paths 504. As shown in FIG. 5B, the apertures 302, 304 of the mesh walls 402*a-d*, 404*a, b* (FIG. 4) form transverse paths between elongated passageways (e.g., the elongated passageways 204, 206, 214) of the array 112. When fluid flows transversely through the array 112, as shown in FIG. 5B, the low-resistance mesh walls 402*a-d* cause the fluid to pass through twice the number of low-resistance apertures 302 (FIG. 3) in the low-resistance mesh walls 402*a-d* relative to the number of high-resistance apertures 304 (FIG. 3) through which the fluid flows when traversing the high-resistance mesh walls 404*a, b*. Arranging the low-resistance mesh walls 402*a-d* in this manner creates more tortuous fluid paths having a higher flow resistance than a single one of the low-resistance mesh walls 402*a-d*. As such, the low-resistance mesh walls 402*a-d* can be implemented using the relatively lower density, low-resistance apertures 302 while still achieving higher fluid flow restrictions. In turn, using the lower density, low-resistance apertures 302 for the low-resistance mesh walls 402*a-d* decreases material costs associated with fabricating the array 112 because the larger openings of the low-resistance apertures 302 use less material to create than the relatively higher density, high-resistance apertures 304.

Figure 5D:
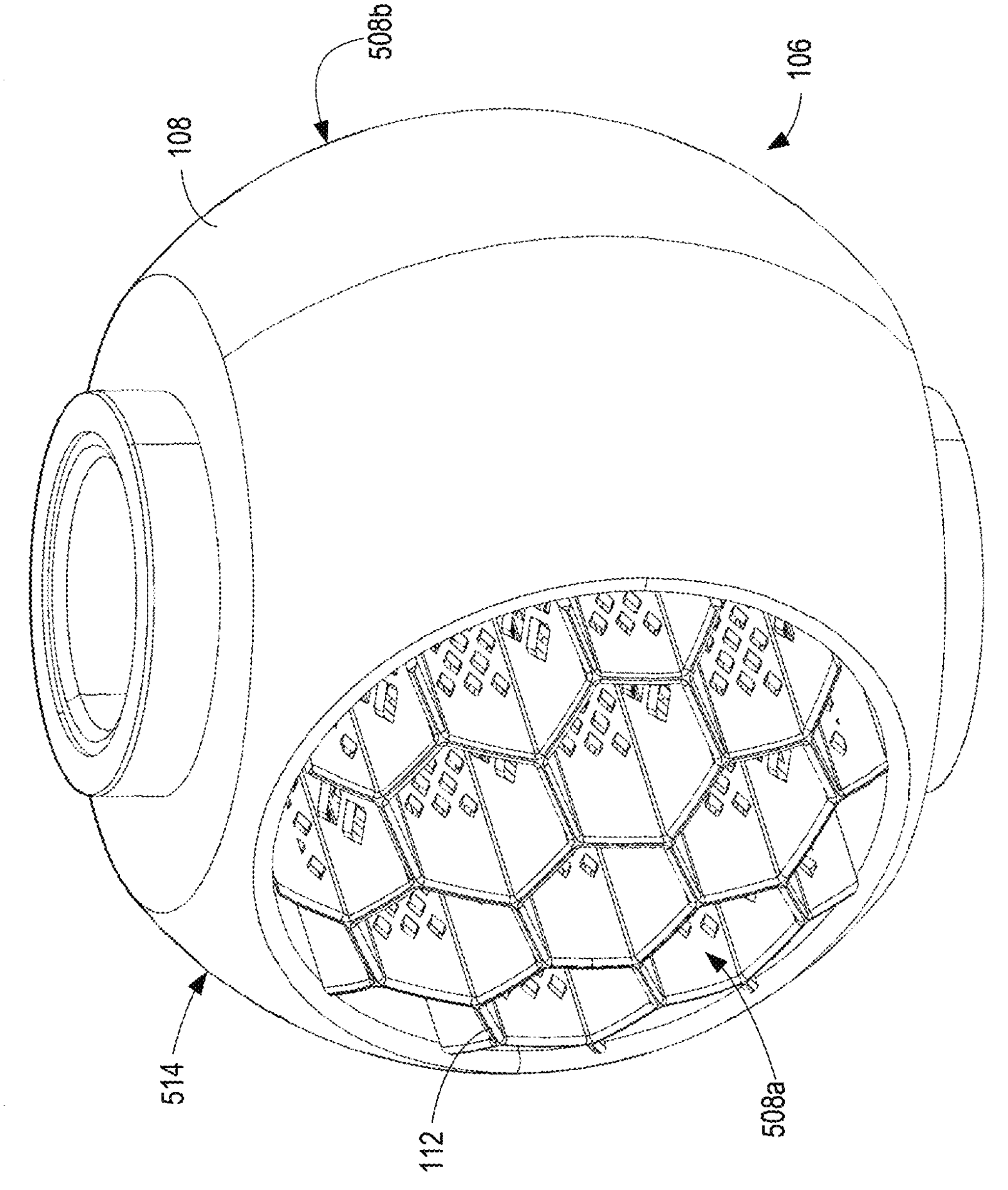
FIG. 5D is a perspective view of a flow control trim including the cellular array of FIGS. 1, 2, and 5A-5C.

FIG. 5D is a perspective view of the trim 106 including the array 112 of FIG. 1. In the example of FIG. 5D, the ball 108 is shown as having a nonpermeable structure (e.g., a shell, a nonpermeable surface, a nonpermeable housing, etc.) that surrounds longitudinal sides of the array 112. A bore through the ball 108 creates inlet and outlet openings 508*a, b* at opposing ends of the array 112. The array 112 is placed through the bore and is fixedly coupled to the ball 108 within the ball bore. For example, the array 112 may be coupled to the ball 108 through welding or any other suitable fastening technique.

As shown in FIG. 5C, the opposing ends of the array 112 are spherically contoured along an example spherical contour 512. The spherical contour 512 of the opposing ends of the array 112 matches an example spherical contour 514 of the ball 108 shown in FIG. 5D. In addition, the spherical contours 512, 514 match a radius of curvature of the valve seat 104 (FIG. 1) such that a spherically contoured surface of the ball 108 sealingly engages the valve seat 104. In examples disclosed herein, the spherically contoured ends of the array 112 are recessed in the ball 108. This creates a clearance between the array 112 and the valve seat 104 so that the spherically contoured ends of the array 112 do not contact or engage the valve seat 104 as the stem 122 is operated to reposition the trim 106 in the valve body 102*a*.

Figure 6:
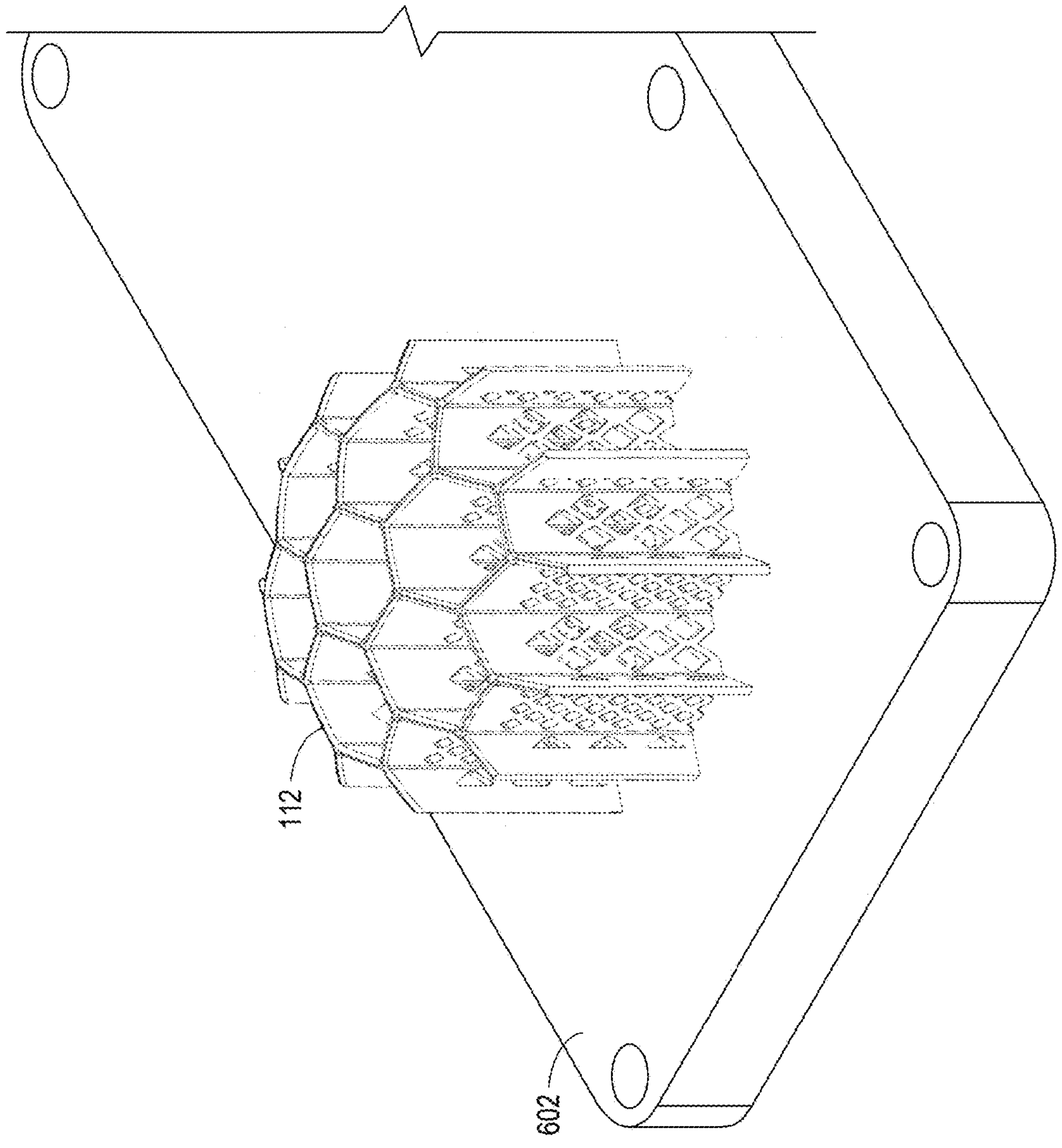
FIG. 6 is a perspective view of an example powder bed fusion additive manufacturing process that may be used to fabricate the cellular array of FIGS. 1, 2, and 5A-5D.

FIG. 6 is a perspective view of an example powder bed fusion additive manufacturing process that may be used to fabricate the array 112 of FIGS. 1, 2, and 5A-5D. In the example of FIG. 6, an example powder bed 602 includes a metallic powder from which the array 112 is formed. The metallic powder may be selected to be any metal material suitable for the particular application (e.g., type of fluid) in which the array 112 is to be used. For example, some metals have better anti-corrosive properties, strength properties, etc. for certain types of fluids than others. During the powder bed fusion additive manufacturing process, one or more high-heat laser(s) is/are focused and guided along profile lines of the array 112 to melt the metallic powder in the powder bed 602 and fuse the resulting molten metal together according to the structural design of the array 112. After one profile layer is formed, the partially completed array 112 is lifted slightly off the powder bed 602 to laser-form the next profile layer and fuse the next profile layer to the previously formed profile layer. This process is repeated until the array 112 is completed as shown in FIG. 2.

Figure 8:
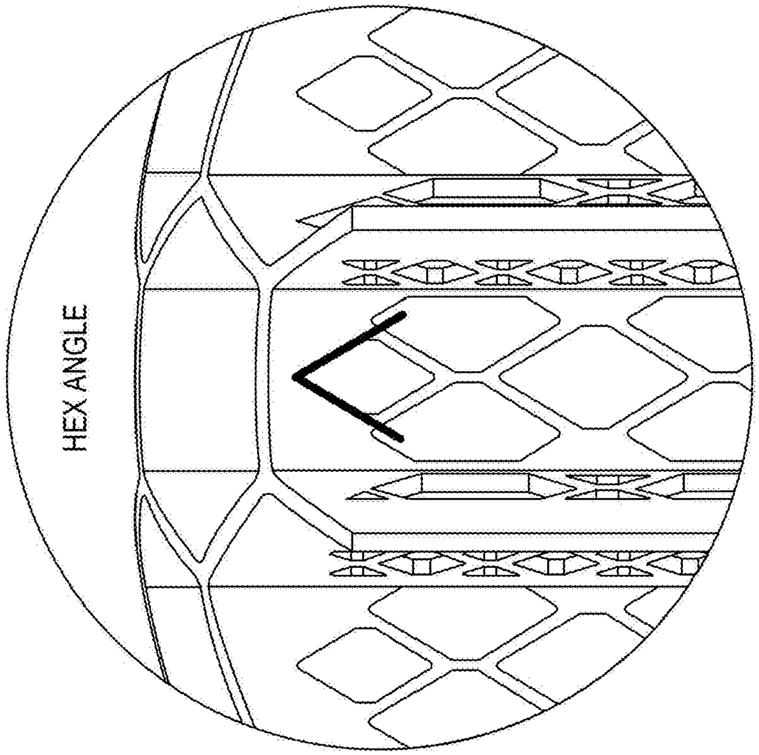
FIG. 8 is a magnified view of an example low-restriction mesh wall of the cellular array of FIGS. 1, 2, and 5A-5C.
Figure 7:
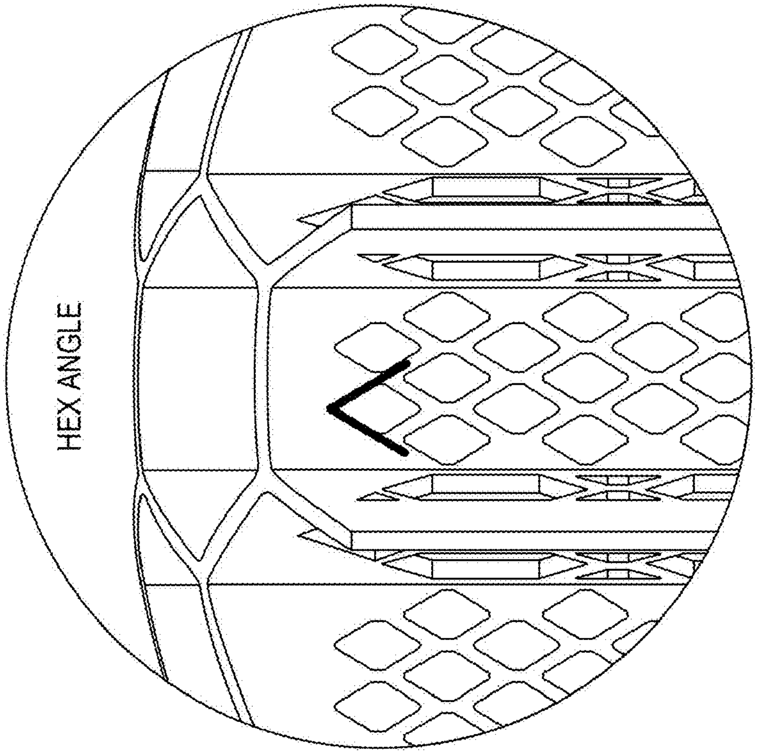
FIG. 7 is a magnified view of an example high-restriction mesh wall of the cellular array of FIGS. 1, 2, and 5A-5C.

In some examples, the powder bed fusion additive manufacturing process forms acute angles of the apertures 302, 304 (FIG. 3) at approximately 30-degree angles. For example, an example acute angle 702 of the high-resistance apertures 304 shown in FIG. 7 is equal to approximately 30 degrees and matches an example acute angle 802 of the low-resistance apertures 302 of FIG. 8. However, apertures 302, 304 may be manufactured using any other suitable measures of degrees for the acute angles 702, 802.

Additive manufacturing, such as the powder bed fusion additive manufacturing process of FIG. 6, allows the array 112 to be manufactured as a second piece of the trim 106 (FIGS. 1 and 5D) separate from the ball 108 (FIGS. 1 and 5D). The array 112 can then be placed in the ball 108 and welded to the ball 108. In examples disclosed herein, a length of the array 112 is shorter than a diameter of the ball 108 so that both ends of the array 112 are recessed in the ball 108 below a seal surface (e.g., the spherically contoured surface) of the ball 108. This creates a clearance between the ends of the array 112 and the valve seat 104 to prevent the ends of the array 112 from contacting the valve seat 104 as the trim 106 is repositioned between opened and closed positions. The additive manufacturing can be used to fabricate the array 112 to specified dimensions that provide it a clearance fit through the bore of the ball 108 so that it can be welded into place for fixed attachment to the ball 108. The array 112 may be manufactured using any suitable fabrication technique in addition to or instead of powder bed fusion additive manufacturing.

Figure 9:
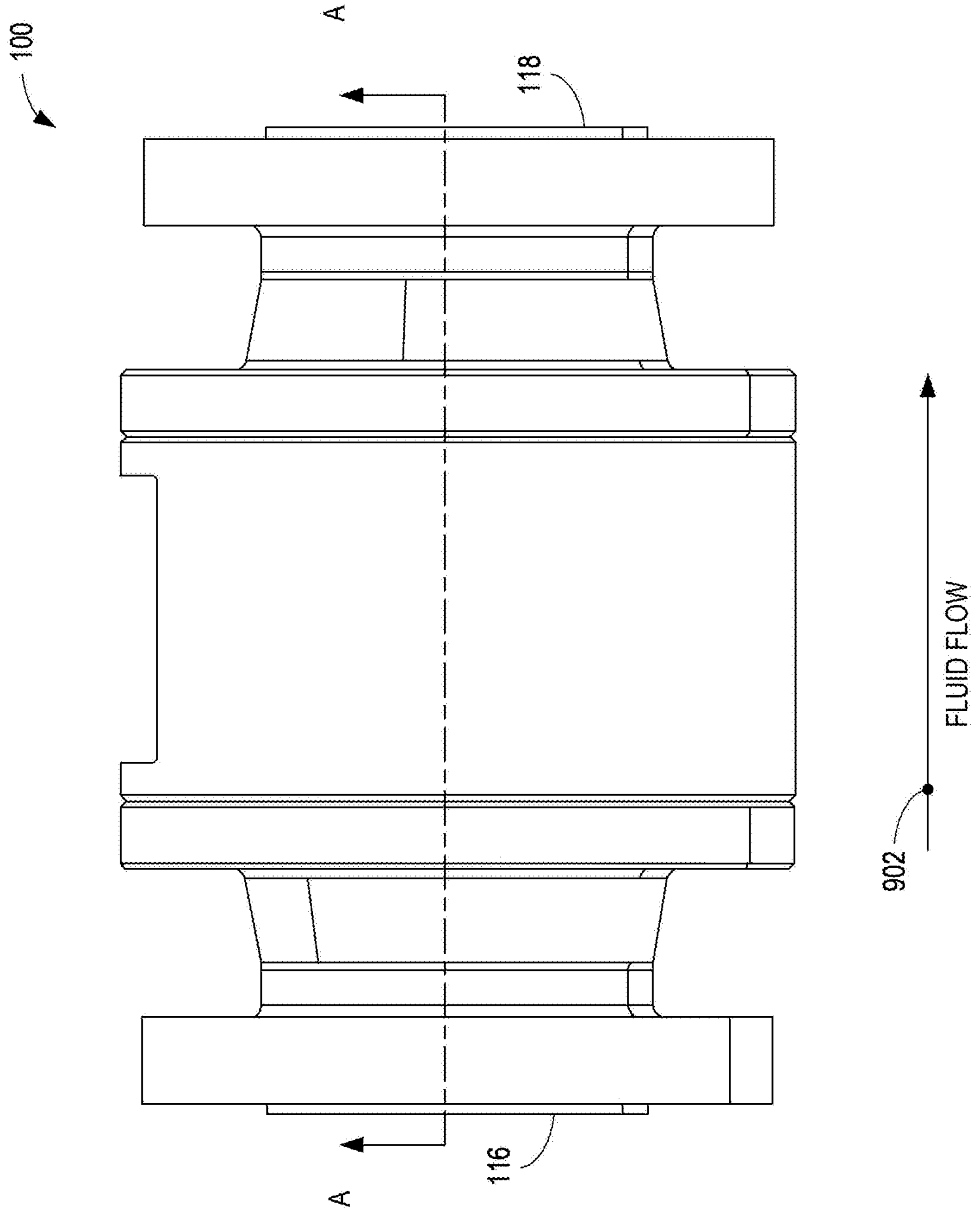
FIG. 9 is a side view of the ball valve assembly of FIG. 1.

FIG. 9 is a side view of the ball valve assembly 100 of FIG. 1. In the illustrated example, fluid flows in a direction generally indicated by arrow 902 into the ball valve assembly 100 through the inlet port 116 and out of the ball valve assembly 100 through the outlet port 118. The ball valve assembly 100 is sectioned at line A-A for purposes of illustration of FIGS. 10A, 10B, 11A, 11B, 12A, and 12B described below. As shown in FIGS. 10A, 10B, 11A, 11B, 12A, and 12B, the mesh walls (e.g., the mesh walls 202, 212 of FIG. 2, the mesh walls 402*a-d*, 404*a, b* of FIG. 4) allow fluid to permeate transversely between elongated passageways (e.g., the elongated passageways 204, 206, 214 of FIG. 2) and cause the array 112 to operate like a staged pressure drop in the ball valve assembly 100. The staged drop substantially reduces or eliminates cavitation in the ball valve assembly 100 at low to intermediate positions of the trim 106 within the valve body 102*a* (e.g., 0 to 45-degree positioning of the ball relative to the fluid flow direction 902). For example, during such low to intermediate positions of the trim 106, fluid is permitted to flow in the first few elongated passageways of the array 112 such that the array 112 encourages the fluid to permeate transversely between the elongated passageways through apertures (e.g., the apertures 302, 304 of FIG. 3) in its mesh walls to exit the trim 106 towards the outlet port 118 of the ball valve assembly 100. As the trim 106 is repositioned to create a larger opening through the valve assembly 100, fluid resistance through the array 112 decreases and fluid flow rate increases as the elongated passageways move towards being more parallel with the inlet port 116 and the outlet port 118 of the ball valve assembly 100. Accordingly, the repositioning of the trim 106 in the valve assembly 100 changes the size of the axial projected area of the array 112, as shown in FIGS. 10A, 10B, 11A, 11B, 12A, and 12B, to control fluid flow through the valve assembly 100.

Figure 10B:
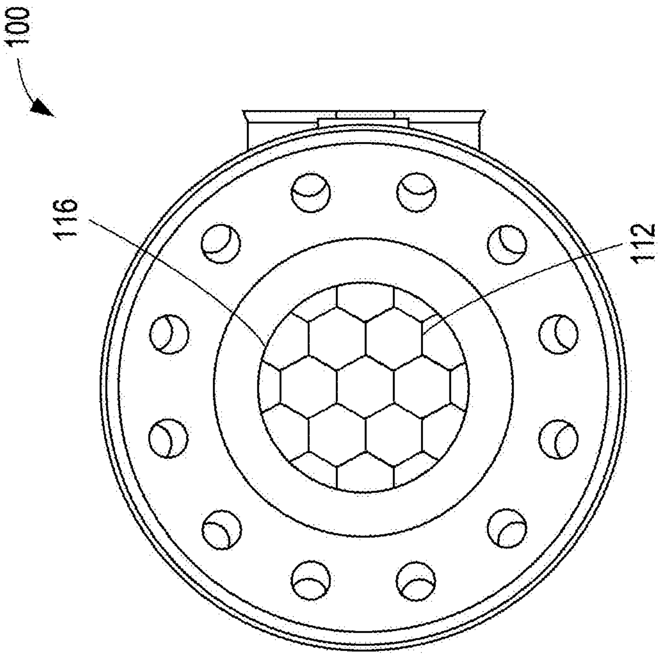
FIG. 10B is a front view of the ball valve assembly of FIGS. 1 and 9 showing the fully-open flow control trim position of FIG. 10A through an inlet of the ball valve assembly.
Figure 10A:
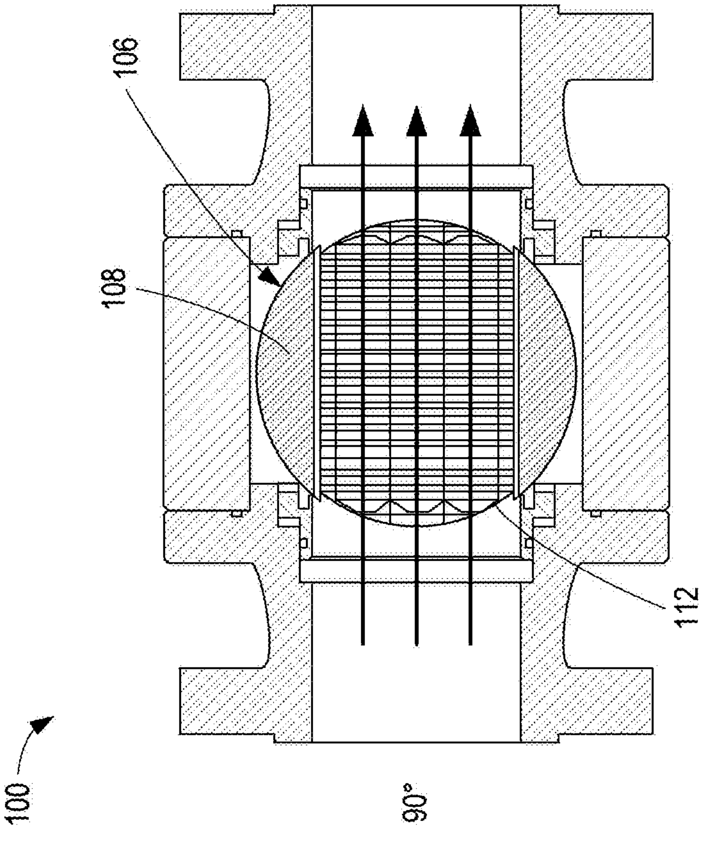
FIG. 10A is a cross-sectional view of the ball valve assembly of FIGS. 1 and 9 showing the flow control trim of FIGS. 1 and 5D in a fully-open position, the cross-section taken at A-A of FIG. 9.

FIG. 10A is a cross-sectional view of the ball valve assembly 100 of FIGS. 1 and 9 showing the flow control trim 106 of FIGS. 1 and 5D in a fully-open position. The cross-section of FIG. 10A is taken at cross-section line A-A of FIG. 9. In the illustrated example of FIG. 10A, elongated passageways of the trim 106 run substantially parallel to a direction of fluid flow through the ball valve assembly 100. As such, the fluid is substantially unobstructed or substantially unrestricted by the array 112 in the trim 106 in the fully-open position. FIG. 10B is a front view of the ball valve assembly 100 of FIGS. 1 and 9 showing the fully-open position of the trim 106 of FIG. 10A through the inlet port 116 of the ball valve assembly 100 in the fully-open position.

Figure 11B:
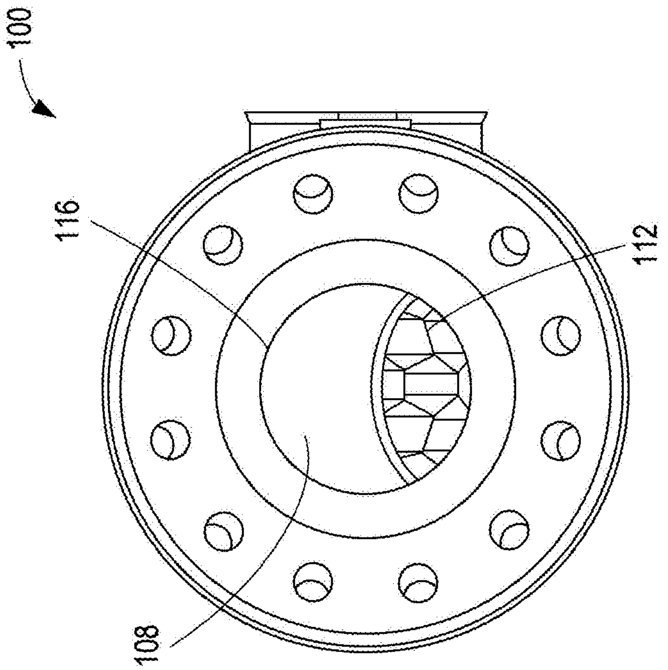
FIG. 11B is a front view of the ball valve assembly of FIGS. 1 and 9 showing the partially-open flow control trim position of FIG. 11A through an inlet of the ball valve assembly.
Figure 11A:
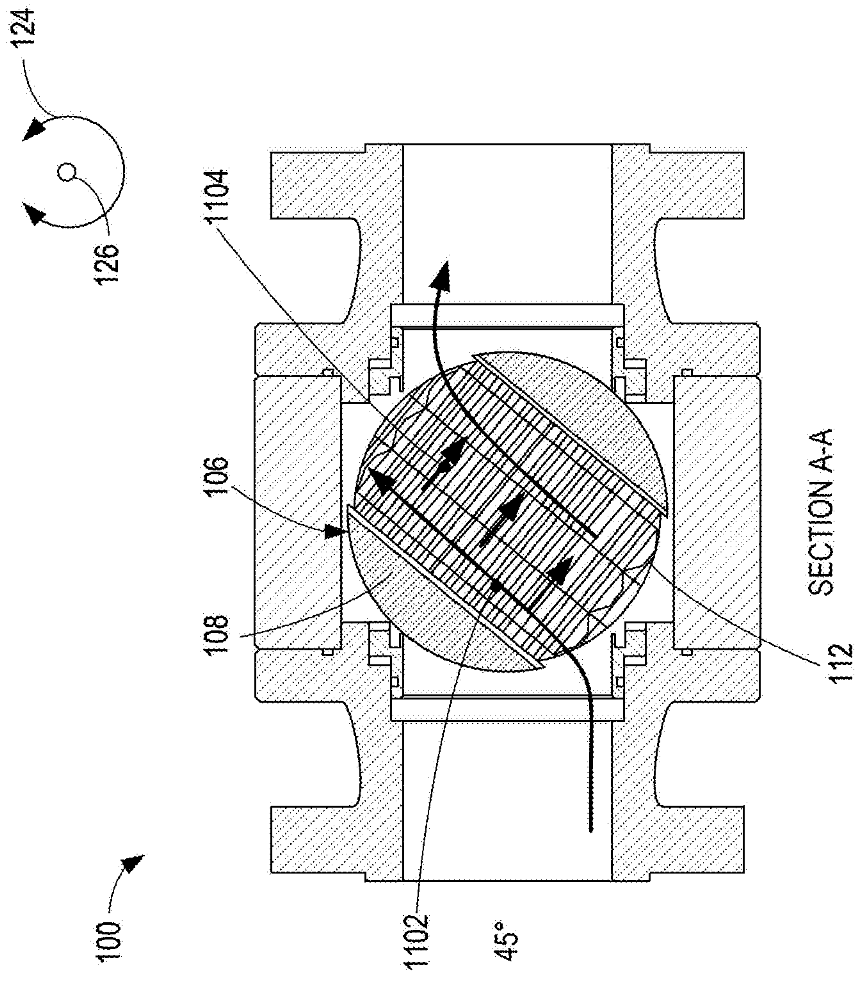
FIG. 11A is a cross-sectional view of the ball valve assembly of FIGS. 1 and 9 showing the flow control trim of FIGS. 1 and 5D in a partially-open position, the cross-section taken at A-A of FIG. 9.

FIG. 11A is a cross-sectional view of the ball valve assembly 100 of FIGS. 1 and 9 showing the flow control trim 106 of FIGS. 1 and 5D in a partially-open position after repositioning of the trim 106 along the rotational direction 124 about the axis of rotation 126. The cross-section of FIG. 11A is taken at cross-section line A-A of FIG. 9. In example FIG. 11A, the flow control trim 106 is rotationally positioned at 45 degrees about the axis of rotation 126 relative to a fully closed position. In the illustrated example of FIG. 11A, elongated passageways of the trim 106 are angularly offset from a direction of fluid flow through the ball valve assembly 100. Accordingly, fluid flow is more restricted through the array 112 than in the fully-open position of FIG. 10A. For example, to move through the trim 106, the fluid flows through elongated passageway paths 1102 along a length of the array 112 and move through transverse paths 1104 created by apertures (e.g., the apertures 302, 304 of FIG. 3) between neighboring elongated passageways. As such, in the partially-open position of FIG. 11A, the array 112 creates the tortuous paths to increase flow resistance through the array 112, thereby substantially reducing or eliminating cavitation of fluid flowing through the ball valve assembly 100. FIG. 11B is a front view of the ball valve assembly 100 of FIGS. 1 and 9 showing the partially-open position of the flow control trim 106 of FIG. 11A through the inlet port 116 of the ball valve assembly 100. In the partially-open position of FIG. 11B, part of the inlet of the array 112 is accessible to fluid. As such, fluid flow through the trim 106 is restricted by the portion of the ball 108 covering the inlet port 116.

Figure 12B:
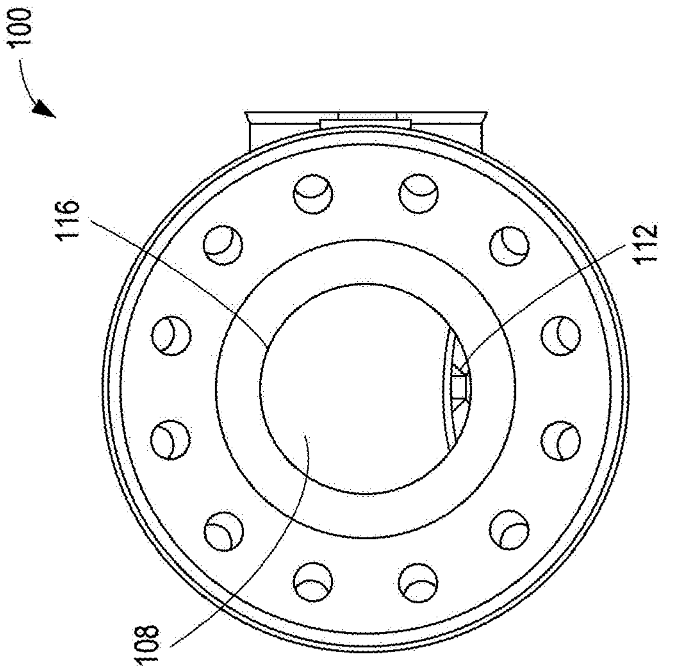
FIG. 12B is a front view of the ball valve assembly of FIGS. 1 and 9 showing the second partially-open flow control trim position of FIG. 12A through an inlet of the ball valve assembly.
Figure 12A:
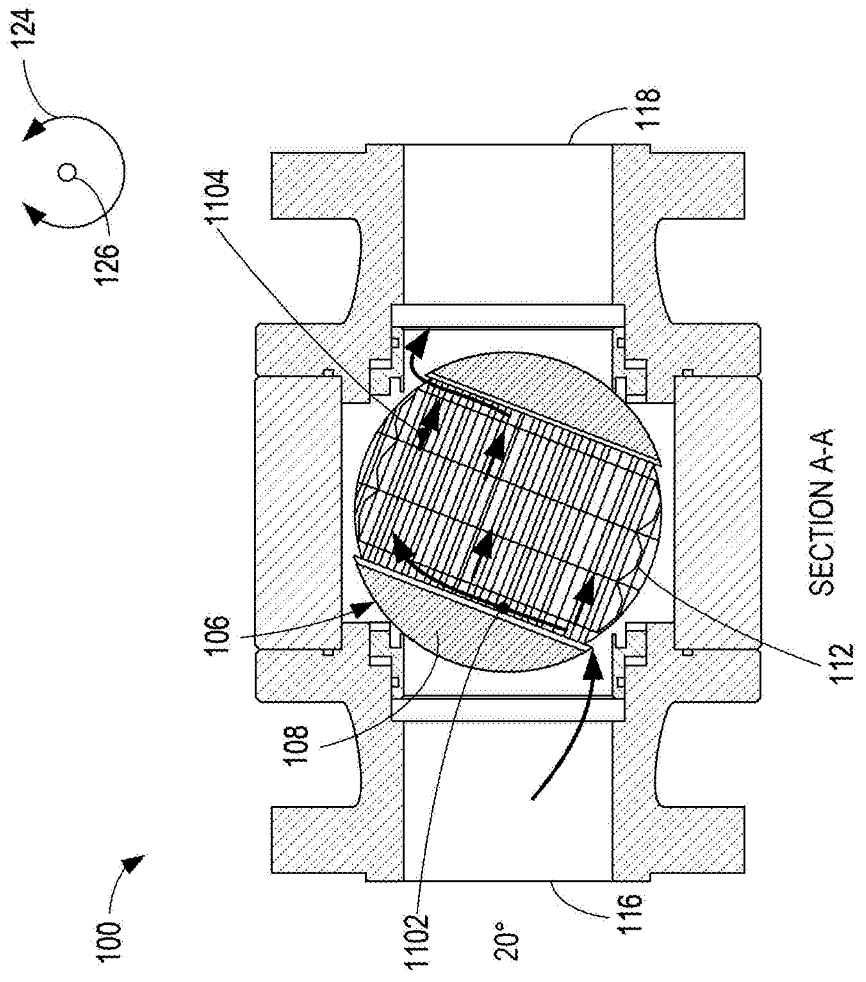
FIG. 12A is a cross-sectional view of the ball valve assembly of FIGS. 1 and 9 showing the flow control trim of FIGS. 1 and 5D in a second partially-open position, the cross-section taken at A-A of FIG. 9.

FIG. 12A is a cross-sectional view of the ball valve assembly 100 of FIGS. 1 and 9 showing the flow control trim 106 of FIGS. 1 and 5D in a second partially-open position after further repositioning of the trim 106 along the rotational direction 124 about the axis of rotation 126. The cross-section of FIG. 12A is taken at cross-section line A-A of FIG. 9. In example FIG. 12A, the flow control trim 106 is rotationally positioned at 20 degrees about the axis of rotation 126 relative to a fully closed position. FIG. 12B is a front view of the ball valve assembly 100 showing the second partially-open position of the flow control trim 106 of FIG. 12A through the inlet port 116 of the ball valve assembly 100. In the second partially-open position of FIG. 12B, a smaller portion of the inlet of the array 112 is accessible to fluid relative to the partially-open position of FIGS. 11A and 11B. As such, fluid flow through the trim 106 is further restricted by a larger portion of the ball 108 covering the inlet port 116.

In the illustrated example of FIG. 12A, the elongated passageways of the trim 106 are even further angularly offset from a direction of fluid flow through the ball valve assembly 100 relative to the partially-open position of FIG. 11A. In the example of FIG. 11A, the elongated passageways of the trim 106 are closer to a 90-degree position (e.g., perpendicular) relative to the direction of fluid flow. Accordingly, fluid flow is even more restricted through the array 112 than in the partially-open position of FIG. 11A. In the example of FIG. 12A, to move through the trim 106, the fluid entering the inlet port 116 of the ball valve assembly 100 has access to fewer openings of elongated passageways of the array 112. As such, the fluid enters and exits the trim 106 through fewer elongated passageway paths 1102 that are along the length of the array 112. To progress towards the outlet port 118 of the ball valve assembly 100, the fluid moves through the transverse paths 1104 created by the apertures (e.g., the apertures 302, 304 of FIG. 3) between neighboring elongated passageways. As such, in the second partially-open position of FIG. 12A, flow restriction is increased through the combination of decreasing the points of ingress into the array 112, creating tortuous paths traversing the elongated passageways to increase flow resistance through the array 112, and reducing the points of egress out of the array 112. This substantially reduces or eliminates cavitation of fluid flowing through the ball valve assembly 100.

From the foregoing, it will be appreciated that example systems, apparatus, articles of manufacture, and methods have been disclosed that create cellular arrays for use in flow control trims of valve assemblies. Disclosed systems, apparatus, articles of manufacture, and methods improve the performance of valves in a fluid process system by substantially reducing or eliminating cavitation as fluids flow through the valves. Disclosed systems, apparatus, articles of manufacture, and methods are accordingly directed to one or more improvement(s) in the operation of a valve assembly.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, unless otherwise stated, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, surface, structure, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" modifies its subjects/values to recognize the potential presence of variations that occur in real-world applications. For example, "approximately" may modify dimensions that may not be exact due to manufacturing tolerances and/or other real world imperfections as will be understood by persons of ordinary skill in the art. For example, "approximately" may indicate such dimensions may be within a tolerance range of +/−10% unless otherwise specified herein.

Example valve trims having cellular arrays are disclosed herein. Further examples and combinations thereof include the following:

Example 1 includes a flow control trim comprising a honeycomb array including mesh walls surrounding elongated paths between opposing ends of the honeycomb array, and a nonpermeable structure surrounding longitudinal sides of the honeycomb array, the nonpermeable structure having openings at the opposing ends of the honeycomb array.

Example 2 includes the flow control trim of example 1, wherein the honeycomb array is fixedly coupled to the nonpermeable structure.

Example 3 includes the flow control trim of one or both of example 1 or example 2, wherein the mesh walls include a first mesh wall between a first elongated path and a second elongated path of the elongated paths, and a second mesh wall between the second elongated path and a third elongated path of the elongated paths.

Example 4 includes the flow control trim of any one or more of examples 1-3, wherein the first mesh wall includes first apertures that are smaller than second apertures of the second mesh wall.

Example 5 includes the flow control trim of any one or more of examples 1-4, wherein the first apertures form transverse paths between the first and second elongated paths.

Example 6 includes the flow control trim of any one or more of examples 1-5, wherein the nonpermeable structure and the opposing ends of the honeycomb array have spherical contours.

Example 7 includes the flow control trim of any one or more of examples 1-6, wherein apertures of the mesh walls are diamond-shaped or hexagon-shaped.

Example 8 includes the flow control trim of any one or more of examples 1-7, wherein the elongated paths have hexagon-shaped profiles.

Example 9 includes a valve assembly comprising a valve body including an inlet and an outlet, a flow control trim rotatably coupled to the valve body, the flow control trim including a spherically-contoured housing, and a cellular array fixedly coupled to the spherically-contoured housing, the cellular array including a plurality of elongated passageways along a length of the cellular array, the elongated passageways including a first mesh structure extending along the length of the cellular array, the first mesh structure between a first elongated passageway and a second elongated passageway of the elongated passageways, and a second mesh structure along the length of the cellular array, the second mesh structure between the second elongated passageway and a third elongated passageway of the elongated passageways, the first mesh structure including first apertures that are smaller than second apertures of the second mesh structure.

Example 10 includes the valve assembly of example 9, wherein the first apertures are smaller in cross-sectional area than the second apertures.

Example 11 includes the valve assembly of one or both of example 9 or example 10, wherein the first apertures form transverse paths between the first elongated passageway and the second elongated passageway.

Example 12 includes the valve assembly of any one or more of examples 9-11, wherein the first mesh structure and the first apertures are parallel to a fluid flow direction between the inlet and the outlet of the valve body when the flow control trim is in a fully open position in the valve body, and perpendicular to the fluid flow direction between the inlet and the outlet of the valve body when the flow control trim is in a fully closed position in the valve body.

Example 13 includes the valve assembly of any one or more of examples 9-12, wherein at least some of the first apertures and the second apertures are diamond-shaped or hexagon-shaped.

Example 14 includes the valve assembly of any one or more of examples 9-13, wherein an end of the cellular array has a first spherical contour, the first spherical contour matching a second spherical contour of the spherically-contoured housing.

Example 15 includes the valve assembly of any one or more of examples 9-14, further including a valve seat coupled to the valve body, the valve seat to sealingly engage the spherically-contoured housing of the flow control trim.

Example 16 includes a flow control trim comprising a first mesh wall between a first elongated path and a second elongated path, a second mesh wall between the second elongated path and a third elongated path, first rhomboid apertures in the first mesh wall, and second rhomboid apertures in the second mesh wall, the first rhomboid apertures being differently sized relative to the second rhomboid apertures.

Example 17 includes the flow control trim of example 16, wherein the first mesh wall creates a higher fluid flow resistance than the second mesh wall.

Example 18 includes the flow control trim of one or both of example 16 or example 17, wherein apertures of the first and second rhomboid apertures have angles less than or equal to thirty degrees.

Example 19 includes the flow control trim of any one or more of examples 16-18, wherein first and second ends of the first and second mesh walls are spherically contoured.

Example 20 includes the flow control trim of any one or more of examples 16-19, wherein the first rhomboid apertures form transverse passages between the first and second elongated paths.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A flow control trim comprising:

a honeycomb array including mesh walls surrounding elongated paths between opposing ends of the honeycomb array, the mesh walls including:

a first mesh wall between a first elongated path and a second elongated path of the elongated paths, the first mesh wall having first apertures; and a second mesh wall between the second elongated path and a third elongated path of the elongated paths, the second mesh wall having second apertures, the first apertures being larger than the second apertures; and a nonpermeable structure surrounding longitudinal sides of the honeycomb array, the nonpermeable structure having openings at the opposing ends of the honeycomb array.

2. The flow control trim of claim 1, wherein the honeycomb array is fixedly coupled to the nonpermeable structure.

3. The flow control trim of claim 1, wherein the second apertures form transverse paths between the second and third elongated paths.

4. The flow control trim of claim 1, wherein the nonpermeable structure and the opposing ends of the honeycomb array have spherical contours.

5. The flow control trim of claim 1, wherein first and second apertures of the first and second mesh walls are diamond-shaped or hexagon-shaped.

6. The flow control trim of claim 1, wherein the elongated paths have hexagon-shaped profiles.

7. The flow control trim of claim 1,
wherein the first mesh wall is non-perpendicular to a plane that is perpendicular to an axis of rotation of the flow control trim, and
wherein the second mesh wall is perpendicular to a plane that is perpendicular to the axis of rotation of the flow control trim.

8. A valve assembly comprising:
a valve body including an inlet and an outlet;
a flow control trim rotatably coupled to the valve body, the flow control trim including:
a spherically-contoured housing; and
a cellular array fixedly coupled to the spherically-contoured housing, the cellular array including a plurality of elongated passageways along a length of the cellular array, the elongated passageways including:
a first mesh structure extending along the length of the cellular array, the first mesh structure between a first elongated passageway and a second elongated passageway of the elongated passageways; and
a second mesh structure along the length of the cellular array, the second mesh structure between the second elongated passageway and a third elongated passageway of the elongated passageways, the first mesh structure including first apertures that are larger than second apertures of the second mesh structure.

9. The valve assembly of claim 8, wherein the first apertures are larger in cross-sectional area than the second apertures.

10. The valve assembly of claim 8, wherein the second apertures form transverse paths between the second elongated passageway and the third elongated passageway.

11. The valve assembly of claim 8, wherein the second mesh structure and the second apertures are:
parallel to a fluid flow direction between the inlet and the outlet of the valve body when the flow control trim is in a fully open position in the valve body; and
perpendicular to the fluid flow direction between the inlet and the outlet of the valve body when the flow control trim is in a fully closed position in the valve body.

12. The valve assembly of claim 8, wherein at least some of the first apertures and the second apertures are diamond-shaped or hexagon-shaped.

13. The valve assembly of claim 8, wherein an end of the cellular array has a first spherical contour, the first spherical contour matching a second spherical contour of the spherically-contoured housing.

14. The valve assembly of claim 8, further including a valve seat coupled to the valve body, the valve seat to sealingly engage the spherically-contoured housing of the flow control trim.

15. The valve assembly of claim 8, further including a stem coupled to the flow control trim, the stem rotatable about an axis of rotation to change a position of the flow control trim in the valve body,
wherein the first mesh structure is non-perpendicular to a plane that is perpendicular to the axis of rotation of the stem, and
wherein the second mesh structure is perpendicular to a plane that is perpendicular to the axis of rotation of the stem.

16. A flow control trim comprising:
a first mesh wall between a first elongated path and a second elongated path;
a second mesh wall between the second elongated path and a third elongated path;
first rhomboid apertures in the first mesh wall; and
second rhomboid apertures in the second mesh wall, the first rhomboid apertures being differently sized relative to the second rhomboid apertures.

17. The flow control trim of claim 16, wherein the first mesh wall creates a lower fluid flow resistance than the second mesh wall.

18. The flow control trim of claim 16, wherein apertures of the first and second rhomboid apertures have angles less than or equal to thirty degrees.

19. The flow control trim of claim 16, wherein first and second ends of the first and second mesh walls are spherically contoured.

20. The flow control trim of claim 16, wherein the second rhomboid apertures form transverse passages between the second and third elongated paths.

* * * * *